(12) United States Patent
Mutikainen et al.

(10) Patent No.: US 8,433,752 B2
(45) Date of Patent: Apr. 30, 2013

(54) NOTIFICATION OF A BLOCKED USER ENTERING OR PARTICIPATING IN A MULTI-USER CHAT SESSION

(75) Inventors: Jari Mutikainen, Lepsämä (FI); Adamu Haruna, Tampere (FI); Arto Leppisaari, Kangsala (FI)

(73) Assignee: Nokia Corporation, Espoo (FI)

( * ) Notice: Subject to any disclaimer, the term of this patent is extended or adjusted under 35 U.S.C. 154(b) by 974 days.

(21) Appl. No.: 11/260,230

(22) Filed: Oct. 28, 2005

(65) Prior Publication Data

US 2007/0011235 A1 Jan. 11, 2007

(30) Foreign Application Priority Data

Jul. 8, 2005 (GB) .................................. 0514031.4

(51) Int. Cl.
*G06F 15/16* (2006.01)
(52) U.S. Cl.
USPC .......................................... 709/204; 709/206
(58) Field of Classification Search .................. 709/206, 709/204
See application file for complete search history.

(56) References Cited

U.S. PATENT DOCUMENTS

| | | | |
|---|---|---|---|
| 2003/0191762 A1 | 10/2003 | Kalliokulju et al. | |
| 2004/0255032 A1 | 12/2004 | Danieli | 709/229 |
| 2005/0076084 A1* | 4/2005 | Loughmiller et al. | 709/206 |
| 2006/0161853 A1* | 7/2006 | Chen et al. | 715/758 |
| 2006/0168009 A1* | 7/2006 | Lyle et al. | 709/206 |

FOREIGN PATENT DOCUMENTS

| | | |
|---|---|---|
| EP | 1 487 169 A2 | 12/2004 |
| EP | 1487169 A2 | 12/2004 |
| JP | 9214618 A | 8/1997 |

OTHER PUBLICATIONS

J. Rosenberg, A Framework for Conferencing with the Session Initiation Protocol draft-ietf-sipping-conferencing-framework-01 (Oct. 27, 2003, retrieved from http://www.tools.ietf.org/html/draft-ietf-sipping-conferencing-framework-01 on Jul. 11, 2008 ).*
Open Mobile Alliance, Instant Messaging Requirements Draft Version 1.0.0—Nov. 7, 2004 ( Nov. 7, 2004, retrieved from http://member.openmobilealliance.org/ftp/Public_documents/REQ/Permanent_documents/ on Jul. 11, 2008).*
M. Day, A Model for Presence and Instant Messaging (Feb. 2000, retrieved from http://tools.ietf.org/html/rfc2778 on Aug. 1, 2008).*
A. B. Roach. "Request for Comments (RFC) 3265: Session Initiation Protocol (SIP)—Specific Event Notification", Network Working Group, Jun. 2002, 39 pages.*

(Continued)

*Primary Examiner* — Liangche A Wang
(74) *Attorney, Agent, or Firm* — Harrington & Smith

(57) ABSTRACT

A method of managing chat services in a communications system comprising the steps of: a first user terminal initiating a chat session with a session manager; said first user terminal inviting a second user terminal to join the chat session, wherein the second user terminal is associated with a blocklist of blocked users that are blocked from communicating with the second user terminal; checking if a third user terminal invited to join the chat session by the first user terminal is listed in the blocklist; and in the event that the third user terminal is in the blocklist, creating a notification message to notify a user of the second user terminal that a blocked user is joining the chat session.

17 Claims, 6 Drawing Sheets

OTHER PUBLICATIONS

SAMS: *Video and Audio Conferencing: iChat AV* XP002405304, Jun. 20, 2005, pp. 1-27.
International Search Report PCT/IB2006/001924.
"A Presence Event Package for the Session Initiation Protocol (SIP)", RFC 3856, J. Rosenberg, Aug. 2004, 27 pgs.
"A Session Initiation Protocol (SIP) Event Package for Conference State", RFC 4575, J. Rosenberg, et al., Aug. 2006, 48 pgs.
"The Session Description Protocol (SDP) Label Attribute", RFC 4574, O. Levin et al., Aug. 2006, 8 pgs.
"SIP: Session Initiation Protocol", RFC 3261, J. Rosenberg et al., Jun. 2002, 269 pgs.
"A Session Initiation Protocol (SIP) Event Package for Conference State draft-ietf-sipping-conference-package-12", J. Rosenberg, et al., Jul. 1, 2005, 48 pgs.

* cited by examiner

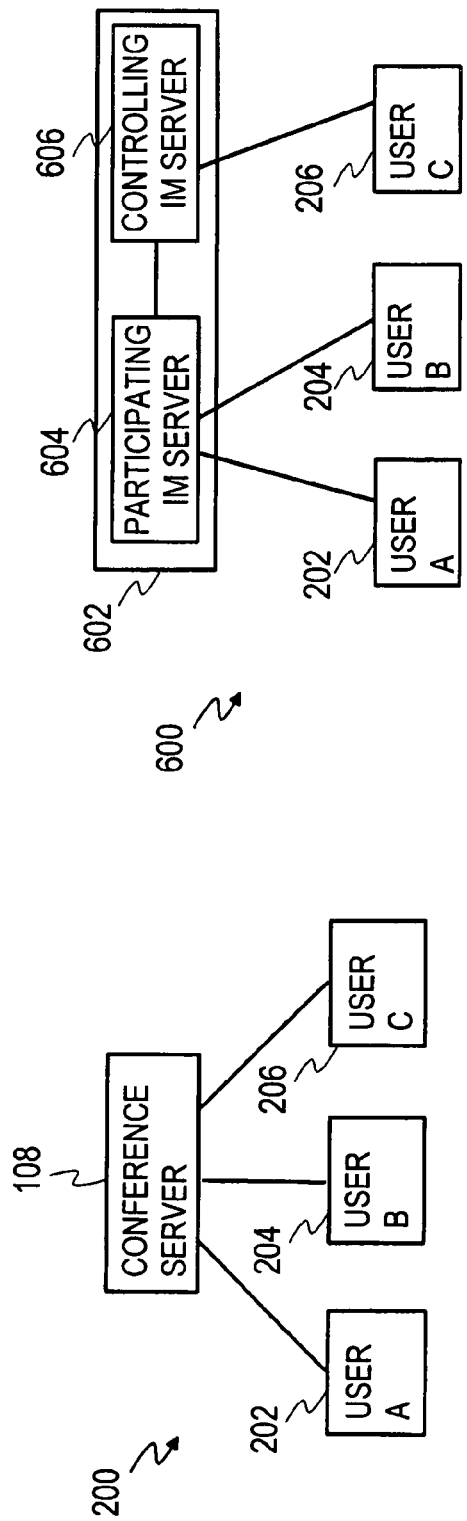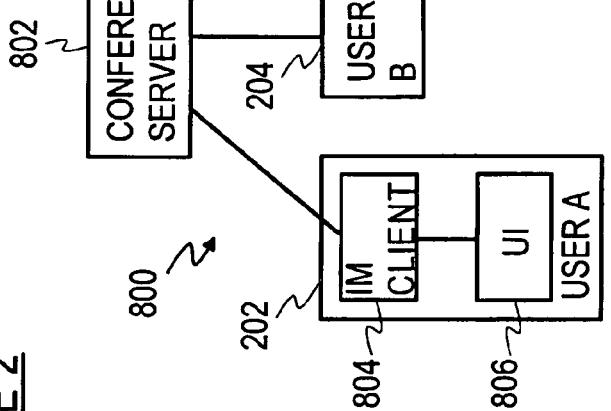

NOTIFICATION OF A BLOCKED USER ENTERING OR PARTICIPATING IN A MULTI-USER CHAT SESSION

This invention relates to multi-user services in a communications system, particularly but not exclusively for instant messaging based on SIP.

Instant messaging (IM) is a communication service that allows users to communicate with each other using messages that are delivered to the users in a substantially real-time manner. When a user creates a message on a terminal it is delivered to the other users participating the in the instant messaging session immediately, allowing them to subsequently reply. An instant messaging session such as this is also known as a chat session.

Instant messaging services are well known over fixed line networks such as the Internet, using for example desktop PCs and instant messaging software. However, they are also expected to become increasingly popular services for use in mobile communication systems.

Instant messaging services may be implemented using the session initiation protocol (SIP) as developed by the internet engineering task force (IETF). The session initiation protocol is an application-layer control protocol for creating, modifying and terminating sessions with one or more participants (end points). SIP was generally developed to allow the initiation of a session between two or more end points in the internet by making these end points aware of the session semantics. A user connected to a SIP based communication system may communicate with various entities of the communication system based on standardised SIP messages. The IETF is currently working on providing IM and presence services based on SIP, under the title "SIP for instant messaging and presence leveraging extensions" (SIMPLE). The Open Mobile Alliance (OMA) is also working on SIP/SIMPLE IM and SIP/SIMPLE Presence.

Instant messaging services should give users the provision to prevent certain other users from communicating with them. In particular, certain users may be nuisance to others. Therefore, instant messaging services allow a user to block particular other users from making contact with them. Each user has a list of the users that it has blocked, and this is called their blocklist.

However, in scenarios where there are multiple participants to an instant messaging session (known as a chat room), there can be problems in managing situations where different users are invited to a chat room by a third party, but the invited users may be blocked from communicating with each other. In order to illustrate this situation, consider the following example. A user, called User C, creates a chat room, and invites User A and User B to join the chat room. However, User A has blocked User B from communicating with him (i.e. User B is in User A's personal blocking list).

The instant messaging system is faced with the problem of preventing User B from communicating with User A (as User B is in User A's blocklist), whilst not disclosing the contents of User A's personal blocklist to a third party (such as the creator of the chat room, i.e. User C). In addition, a blocked user may not be aware that he is on another user's blocklist, and therefore blocked from communicating with them.

One possible solution to this problem is to allow User C (the chat room creator) to invite whichever users he wants, without knowing any of the invitee's blocklist preferences. However, if a user is invited that appears on the blocklist of another user (e.g. User B appears on the blocklist of User A), then the system should discard the invitation to the blocked user. The invitation therefore never reaches User B in this example. User C is not notified that his invitation was discarded.

However, this solution has the disadvantage that from the perspective of the participants of the chat room, it appears that User B has either ignored the invitation, or there is a fault with the IM system or network, and the invitation has not reached User B. In addition, it prevents User B from communicating with any other users in the chat, even though User B may only be blocked from communicating with one particular user (User A in this case).

Another solution is to allow User C to invite any users to the chat room, and these invited users may join regardless of whether they appear in the blocklists of any participants in the chat room. However, the system can filter any messages from a user that is blocked from communicating with another user, such that any messages from the blocked user are not visible to the blocking user. In other words, in this example, User B can join the chat session but any messages that User B sends will not be visible to User A.

The problem with this solution is that all the participants to the session are visible to each other, i.e. User A can see that User B is present, and vice versa. From the perspective of User B it will appear that either his messages are being ignored by User A or that there is a fault in the IM system or network. It may therefore be quite easy for User B (or indeed other users in the chat room) to conclude that he appears in User A's blocklist. It is therefore preferable that a decision on how to handle the blocked users is either performed during the process of the users joining the chat room, or that all users are not visible to each other if they are blocked.

There is therefore a need for a more flexible solution to handling the stated problem, such that a user's personal blocklist is not disclosed to any other participants in a chat room.

According to one aspect of the present invention there is provided a method of managing chat services in a communications system comprising the steps of: a first user terminal initiating a chat session with a session manager; said first user terminal inviting a second user terminal to join the chat session, wherein the second user terminal is associated with a blocklist of blocked users that are blocked from communicating with the second user terminal; checking if a third user terminal invited to join the chat session by the first user terminal is listed in the blocklist; and in the event that the third user terminal is in the blocklist, creating a notification message to notify a user of the second user terminal that a blocked user is joining the chat session.

According to one embodiment of the present invention, the step of creating the notification message is carried out by the session manager.

According to another embodiment of the present invention, the blocklist is stored at the session manager and the session manager performs the step of checking.

According to another embodiment of the present invention, the notification message is sent from the session manager to the second user terminal.

According to another embodiment of the present invention, the blocklist is stored at a blocklist manager in a network separate from a network of the session manager and the blocklist manager performs the step of checking.

According to another embodiment of the present invention, the blocklist is stored at a blocklist manager in the same network as the session manager and the blocklist manager performs the step of checking.

According to another embodiment of the present invention, the notification message is modified by the blocklist manager and is sent from the blocklist manager to the second user terminal.

According to another embodiment of the present invention, the blocklist is stored at a blocklist manager located in the second user terminal and the blocklist manager performs the step of checking.

According to another embodiment of the present invention, the notification message is modified by the blocklist manager and is sent from the blocklist manager to a user interface of the second user terminal.

According to another embodiment of the present invention, the third user terminal is associated with a second blocklist, said method further comprising: checking if the second user terminal is listed in the second blocklist; in the event that the second user terminal is in the second blocklist, creating a notification message to notify a user of the third user terminal that a blocked user is present in the chat session.

According to another aspect of the present invention there is provided a method of managing chat services in a communications system comprising the steps of: a first user terminal initiating a chat session with a session controller; said first user terminal inviting a second user terminal to join the chat session, wherein the second user terminal is associated with a blocklist of blocked users that are blocked from communicating with the second user terminal, said blocklist being stored at the session controller; checking at the session controller if a third user terminal invited to join the chat session by the first user terminal is listed in the blocklist; and in the event that the third user terminal is in the blocklist, despatching a notification message from the session controller to the second user terminal to notify a user of the second user terminal that a blocked user is joining the chat session.

According to another aspect of the present invention there is provided a method of managing chat services in a communications network comprising the steps of: a first user terminal initiating a chat session with a session manager; said first user terminal inviting a second user terminal to join the chat session, wherein the second user terminal is associated with a blocklist of blocked users that are blocked from communicating with the second user terminal, said blocklist being stored at a blocklist manager in the second user terminal; checking at the blocklist manager if a third user terminal invited to join the chat session by the first user terminal is listed in the blocklist; in the event that the third user terminal is in the blocklist, despatching a notification message from the blocklist manager to a user interface of the second user terminal to notify a user of the second user terminal that a blocked user is joining the chat session.

According to another aspect of the present invention there is provided a communications system for providing chat services comprising: a first user terminal for initiating a chat session with a session manager; a second user terminal, said second user terminal being invited to join the chat session by said first user terminal, wherein the second user terminal is associated with a blocklist of blocked users that are blocked from communicating with the second user terminal; a third user terminal, said third user terminal being invited to join the chat session by the first user terminal; means for checking if the third user terminal is listed in the blocklist; and means for creating a notification message to notify a user of the second user terminal that a blocked user is joining the chat session, in the event that the third user terminal is in the blocklist.

For a better understanding of the present invention and to show how the same may be put into effect, reference will now be made, by way of example, to the following drawings in which:

FIG. 2 shows a network structure for a first embodiment of the invention;

FIG. 6 shows a network structure for a second embodiment of the invention;

FIG. 8 shows a network structure for a third embodiment of the invention;

Figure 1:
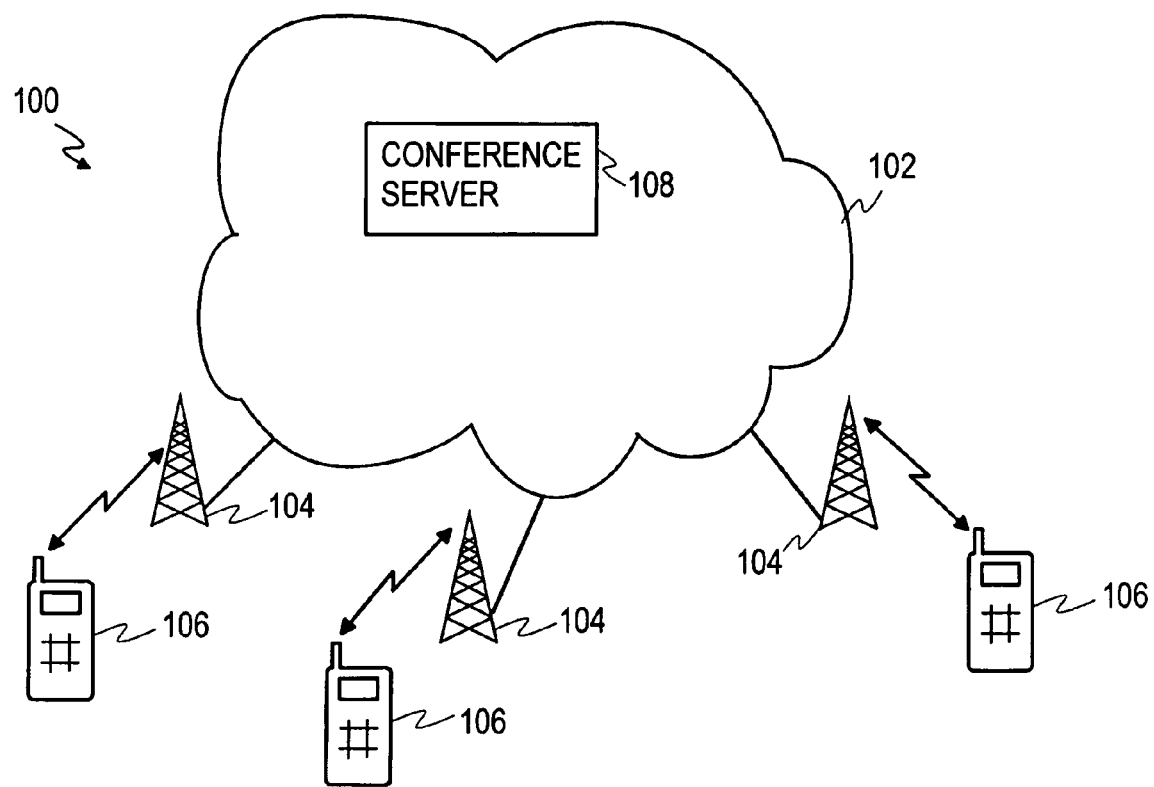
FIG. 1 shows a wireless communication system.

Reference will first be made to FIG. 1, in which is shown a wireless communication system 100. The communication system 100 comprises a network 102, which connects the mobile entities (user terminals 106) participating in a chat session. The network 102 may be a network such as the Internet, or it may be a private network such as telecommunications core network or Ethernet network.

In the embodiment shown in FIG. 1, connected to the network 102 is a plurality of base stations 104. The base stations provide a wireless connection between the user terminals 106 and the network 102. These base stations could be of any known wireless standard. For example, they may be GSM/GPRS base stations (BS), UMTS node-Bs or WLAN access points. In alternative embodiments, the base stations 104 may be replaced with entities that allow a wired connection to the network, for example a modem or router.

The base stations 104 can be connected directly to the network 102, or may be connected to separate networks, which are in turn connected to the network 102 via intermediate entities. In some embodiments the base stations may all be connected to the same network and operate the same wireless standard. In other embodiments, different base stations may be connected to networks separate from each other, and the base stations may operate different wireless standards.

In the embodiment shown in FIG. 1, the user terminals 106 connect to the base stations via a wireless link. The wireless link may be according to any known standard, depending on the type of network the user terminal is connecting to. For example, if the base stations 104 and user terminals 106 comply with the GSM/GPRS standard, the wireless link uses a time division multiple access (TDMA) scheme. Alternatively, if the base stations 104 and user terminals 106 comply with the UMTS standard, the wireless link uses a wideband code division multiple access (WCDMA) scheme. Other possible wireless links include frequency division multiple access (FDMA), carrier sense multiple access (CSMA) and orthogonal frequency division multiplexing (OFDM).

The user terminals 106 are configured to enable a user to participate in chat sessions. Multiple user terminals may be connected to each base station. The users participating in a chat session (referred to as participants hereinafter) may be connected to the same base station or connected to separate base stations. A user terminal 106 may be a wireless mobile station (MS) such as a mobile telephone, a personal digital assistant (PDA) or a laptop computer. In alternative embodiments, the user terminal 106 could be a wired terminal such as a personal computer (PC).

Within the network 102 is a conference server 108. The user terminals 106 connect to the conference server 108 via the base stations 104 in order to participate in a chat session, as will be described hereinafter.

Reference will now be made to FIG. 2, which shows the network structure 200 of a first embodiment of the invention. An exemplary scenario is used to demonstrate the operation of this embodiment of the invention. In this scenario there are three users as shown in FIG. 2, User A 202, User B 204 and User C 206. Each of these users is able to participate in chat sessions, and can connect to the conference server 108 as outlined with regards to FIG. 1. Local IM servers may also be present in the networks of the users. In this scenario, User C creates a chat room. User C then invites User A and User B to the chat room. However, User A has blocked User B from participating in chat sessions with User A. Therefore, User B is in User A's personal list of blocked users, known as his blocklist. The network structure should manage this situation such that User A does not have to converse with User B, but should also not have to divulge his personal blocklist to the creator of the chat room, User C.

Figure 3:
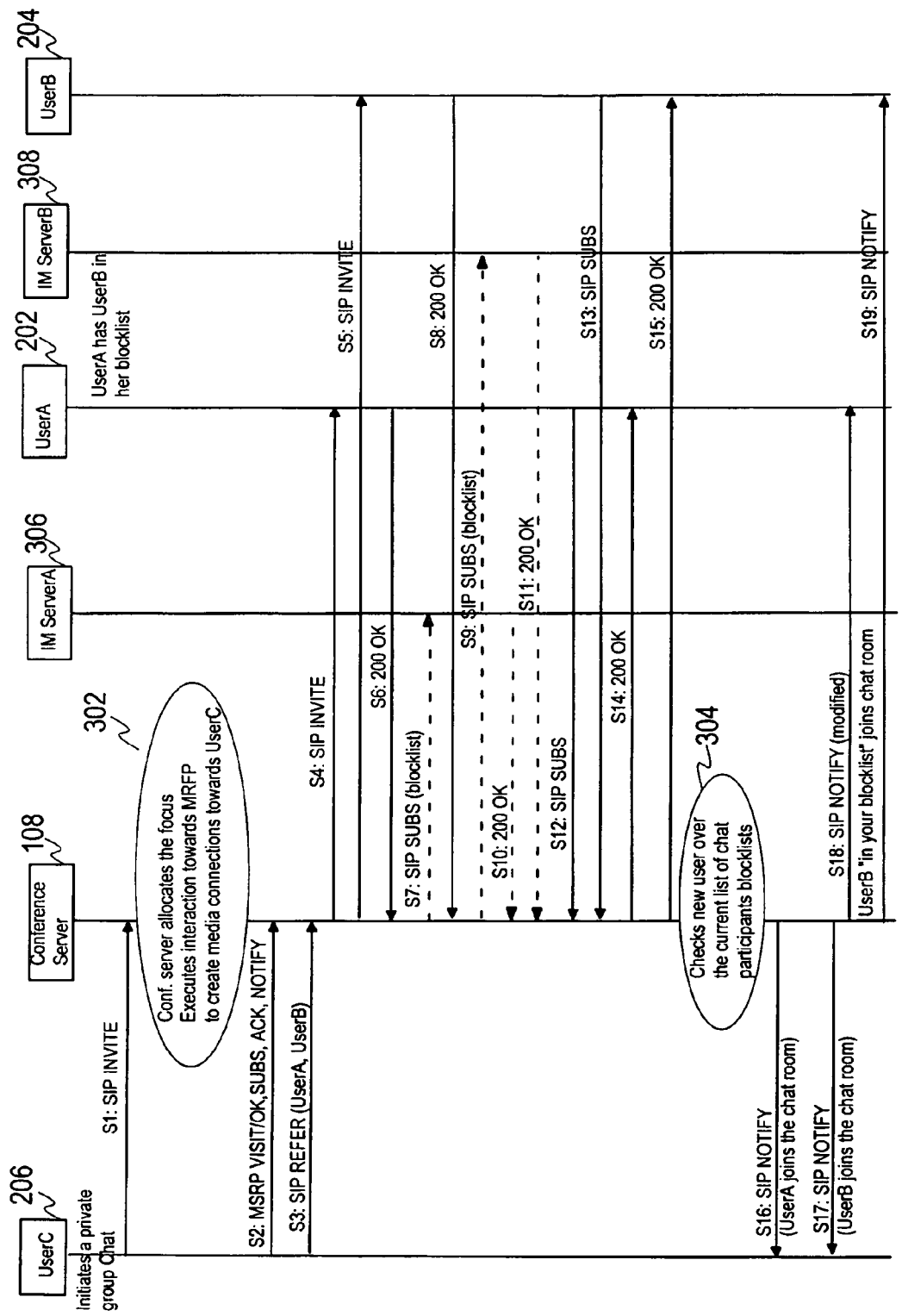
FIG. 3 shows the signalling messages exchanged for the first embodiment of the invention.

FIG. 3 shows how the present embodiment solves this problem. FIG. 3 shows the exchange of signalling messages between the entities described above with reference to FIG. 2. The present embodiment is based on SIP/SIMPLE technology.

As stated above, User C 206 creates a chat room, and this is initiated at step S1 by User C sending a SIP INVITE message to the conference server 108. The conference server at 302 then creates focus instance and reserves mixer resources. Then User C subscribes to the conference state notifications. This process involves communication between the conference server and User C at step S2.

User C then sends a SIP REFER message to the conference server, indicating that User A and User B should be invited to the chat room, at step S3. User C then sends a SIP REFER message to the conference server, indicating that User A and User B should be invited to the chat room. The conference server then sends SIP INVITE messages to User A and User B at steps S4 and S5, respectively. Upon successful receipt of the SIP INVITE messages, User A and User B respond with a 200 OK message at step S6 and S8. Meanwhile, the conference server needs to know the personal blocklist of each of the invitees to the chat room, and the conference server requests this from the local IM server to User A (306) and the local IM server to User B (308) with a SIP SUBSCRIBE message at steps S7 and S9 (for User A and B respectively). These messages are responded to by the local IM server to User A and User B (306 and 308) in steps S10 and S11 respectively with 200 OK messages. The message exchange for the conference server to obtain the blocklists is shown in dashed lines in FIG. 3. The conference server maintains the blocklist of each invited user under the invited user's name.

When the conference server requests the blocklist from the invitees (at step S7 and S9 above) with the subscribe message, the conference server can either make a one-time subscription or a continuous subscription. A one-time subscription retrieves only the current content of the blocklist, whereas a continuous subscription allows the conference server to be notified of any further blocklist modifications. In the case of a continuous subscription, if the invitee changes his blocklist, the conference server is notified and updates its blocklist accordingly. Another alternative for fetching the blocklist is to use the eXtensible Markup Language (XML) Configuration Management Protocol (XCAP). This is an IETF standardised protocol used by the client for creating and managing the blocklist. The OMA SIP/SIMPLE IM service also uses XCAP for the same purpose.

The users A and B send a SIP SUBSCRIBE message to the conference server at S12 and S13 to subscribe to conference change notifications (e.g., that a new user has joined), and these are acknowledged with 200 OK messages from the conference server at steps S14 and S15. The conference server sends a SIP NOTIFY message to User C at steps S16 and S17 to inform User C that User A and User B have joined the chat room.

The conference server performs a check at 304 of each of the users joining the chat room to see of they are included in any of the participating users' blocklists. In the case of User A in this example, User B is in User A's blocklist. Therefore, when User B joins the chat room shortly after User A, the conference server performs a check to see if User B appears in the blocklist of the existing participants, and the conference server finds a match in User A's blocklist. As a result of finding this match in the blocklist, the conference server sends User A a modified SIP NOTIFY message at step S18, which will be described in more detail hereinafter. Any other participants to the chat room who do not have any joining users matching their blocklists will be sent a normal, unmodified, SIP NOTIFY message.

Figure 4:
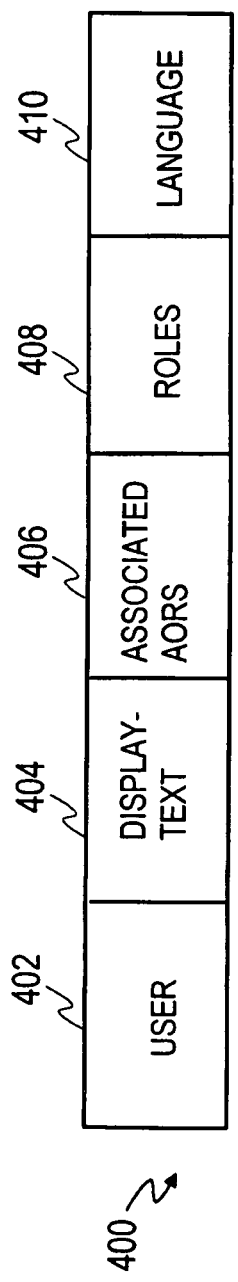
FIG. 4 shows the structure of a known SIP NOTIFY message.
Figure 5:
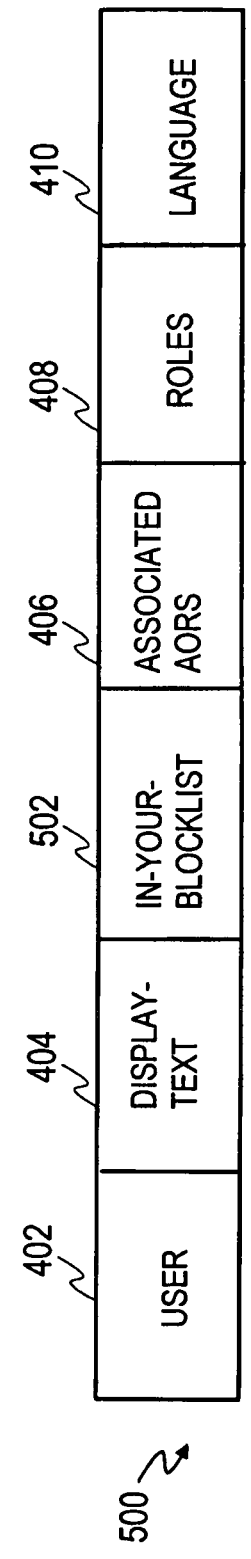
FIG. 5 shows the structure of a modified SIP NOTIFY message.

The basic structure of an unmodified notification message is shown in FIG. 4. This can be compared to the basic structure of the modified notification message as described above, which is shown in FIG. 5. The unmodified message in FIG. 4 contains fields for "user" 402, "display-text" 404, "associated-aors" 406, "roles" 408 and "language" 410. The modified notification message in FIG. 5 contains an extra field "in-your-blocklist" 502, which, by containing the data "yes", indicates that the specified user in the chat room matches one listed in the user's blocklist.

A more detailed representation of the modified notification message, such as that sent in step S18 can be seen below. The new "in-your-blocklist" field added as part of the present embodiment is shown in bold.

```
<user entity="sip:UserB@example.com" state="full">
    <display-text>UserB</display-text>
    <in-your-blocklist>yes</in-your-blocklist>
    <associated-aors>
        <entry>
            <uri>mailto:UserB@example.com</uri>
            <label>email</label>
        </entry>
    </associated-aors>
    <roles>
        <entry>
            <label>participant</label>
        </entry>
    </roles>
    <language>en</language>
<!--
```

Returning again to FIG. 3, upon receiving the modified NOTIFY message, User A is notified that User B, which is in his blocklist, has either joined, been invited, or already exists in the chat room. User A then has the option of staying in the chat room but not viewing any text from User B, updating his blocklist to allow User B's text to be viewed temporarily, or User A can choose to not join and leave the chat room.

If User A chooses to remain in the chat room, but not view any text from User B, then the server may perform the filtering of User B's text. Alternatively, the user terminal may perform the filtering. All other participants in the chat room can see User B's text. No other participants will know that User A is having User B's messages filtered.

Notification of a blocked user only happens once, and after that messages are sent to all participants. However, the conference server may optionally perform further filtering of messages, as mentioned above.

If User B, as a new joining user, had any of the already participating users in his blocklist (e.g. if User B had User A in its blocklist), then User B would be sent a modified NOTIFY message, as above, and would have the same three options as User A outlined previously. However, in the example shown here, User B does not have any of the other participants in his blocklist, and is therefore sent an unmodified NOTIFY message at S19.

Reference will now be made to FIG. 6, which shows the network structure 600 of a second embodiment of the invention. In this scenario there are the same three users as shown in the first embodiment: User A 202; User B 204 and User C 206. As in the first embodiment, User C creates a chat room and invites User A and User B. However, User B is present in User A's blocklist. In the second embodiment of the invention, the conference server 602 architecture comprises two logical elements, the participating IM server 604 (or blocklist manager) and the controlling IM server 606 (or session manager).

The participating IM server resides in the home network of the user that is the recipient of the messages, and is the receiving server and executes the individual recipient's message delivery requirements. The participating IM server maintains the blocklists of the users with which it is associated, and is responsible for performing the blocklist match process. The controlling server is located in the network that hosts/owns the group conversation.

Figure 7:
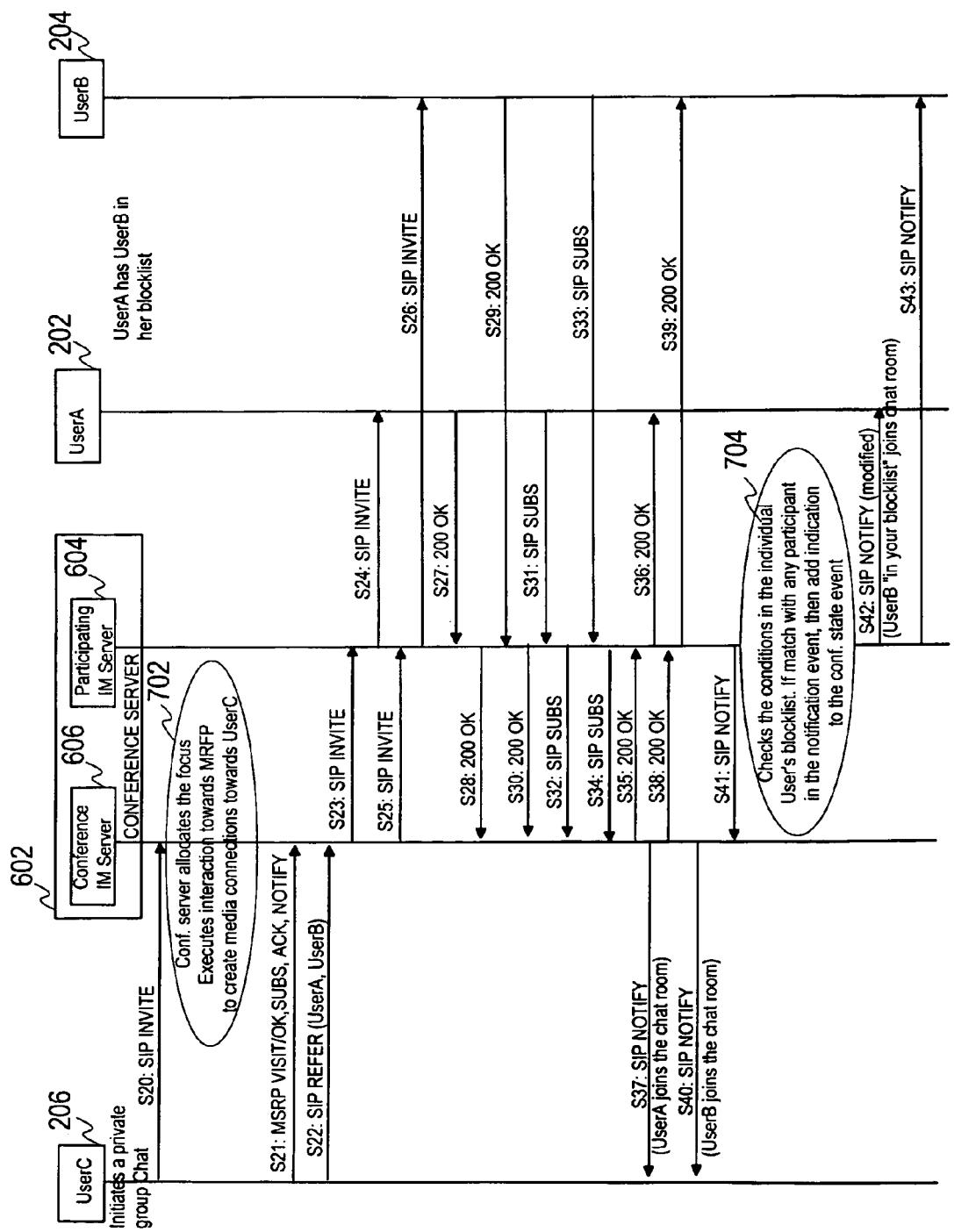
FIG. 7 shows the signalling messages exchanged for the second embodiment of the invention.

FIG. 7 shows the exchange of signalling messages between the entities described above with reference to FIG. 6. In common with the first embodiment, User C initiates the chat session by sending a SIP INVITE message to the controlling IM server 606 at step S20. The controlling IM server at 702 then creates focus instance and reserves mixer resources. Then User C subscribes to the conference state notifications. This process involves communication between the controlling IM server and User C at step S21.

User C then sends a SIP REFER message at step S22 to the controlling IM server, indicating that User A and User B should be invited to the chat room. The controlling IM server then sends a SIP INVITE message to the participating IM server for User A at step S23. A SIP INVITE message is then further sent from the participating IM server to User A at step S24. SIP INVITE messages are also sent to User B via the participating IM server at steps S25 and S26. Upon successful receipt of the SIP INVITE messages, User A and User B respond with a 200 OK message at step S27 and S29, which are sent back to the controlling IM server via the participating IM server at steps S28 and S30.

In contrast to the first embodiment of the invention, the participating IM server of the present embodiment already maintains the blocklists of the users, and therefore there is no requirement for the controlling IM server to subscribe to the blocklist information.

The users A and B send a SIP SUBSCRIBE message to the participating IM server at S31 and S33 to subscribe to conference change notifications (e.g., that a new user has joined), and these are forwarded to the controlling IM server at steps S32 and S34. These messages are acknowledged with 200 OK messages from the controlling IM server, which are passed via participating IM server to User A in steps S35 and S36 and to User B in steps S38 and S39. The controlling IM server sends a SIP NOTIFY message to User C at steps S37 and S40 to inform User C that User A and User B have joined the chat room.

The controlling IM server sends a SIP NOTIFY message to the participating IM server that a new user has joined the chat room at step S41. This message contains an "im-tag" similar to a "poc-tag" in OMA push-to-talk over cellular (PoC), which is used to route the message to the participating IM server. The "im-tag" feature tag is added into Contact or Accept-Contact header in the SIP message.

The participating IM server performs a check at 704 of each of the users joining the chat room to see of they are included in any of the participating users' blocklists. In the case of User A in this example, User B is in User A's blocklist. Therefore, when User B joins the chat room shortly after User A, the participating IM server performs a check to see if User B appears in the blocklist of the existing participants, and the participating IM server finds a match in User A's blocklist. As a result of finding this match in the blocklist, the participating IM server modifies the SIP NOTIFY message from the controlling IM server to indicate that User B is in the blocklist and sends the modified SIP NOTIFY message to User A at step S42. The modified SIP NOTIFY message sent at step S42 can be the same as that described above for the first embodiment of the invention. Any other participants to the chat room who do not have any joining users matching their blocklists will be sent a normal, unmodified, SIP NOTIFY message.

Upon receiving the modified NOTIFY message, User A has the option of staying in the chat room but not viewing any text from User B, updating his blocklist to allow User B's text to be viewed temporarily, or User A can choose to not join and leave the chat room. If User A chooses to remain in the chat room, but not view any text from User B, then the participating IM server may perform the filtering of User B's text. All other participants in the chat room can see User B's text. No other participants will know that User A is having User B's messages filtered. Notification of a blocked user only happens once, and after that messages are sent to all participants. However, the participating IM server may optionally perform further filtering of messages, as mentioned above.

If User B, as a new joining user, had any of the already participating users in his blocklist (e.g. if User B had User A in its blocklist), then User B would be sent a modified NOTIFY message, as above, and would have the same three options as User A outlined previously. However, in the example shown here, User B does not have any of the other participants in his blocklist, and is therefore sent an unmodified NOTIFY message at S43.

A third embodiment of the present invention can be seen with reference to FIG. 8, in which is shown the network structure 800 of this embodiment. In this scenario there are the same three users, User A 202; User B 204 and User C 206, as shown in the first and second embodiments. As in the first and second embodiments, User C creates a chat room and invites User A and User B. However, User B is present in User A's blocklist. In the third embodiment of the invention, the user terminal comprises an IM client 804 and a user interface (UI) 806 (in this case only shown for User A). The network structure comprises a conference server 802, but this does not perform all of the same functions as in the first and second embodiments. In particular, the blocklists of the participants are stored locally in the IM client. The IM client then performs the comparison between joining users or participants in the chat room and the blocklist.

Figure 9:
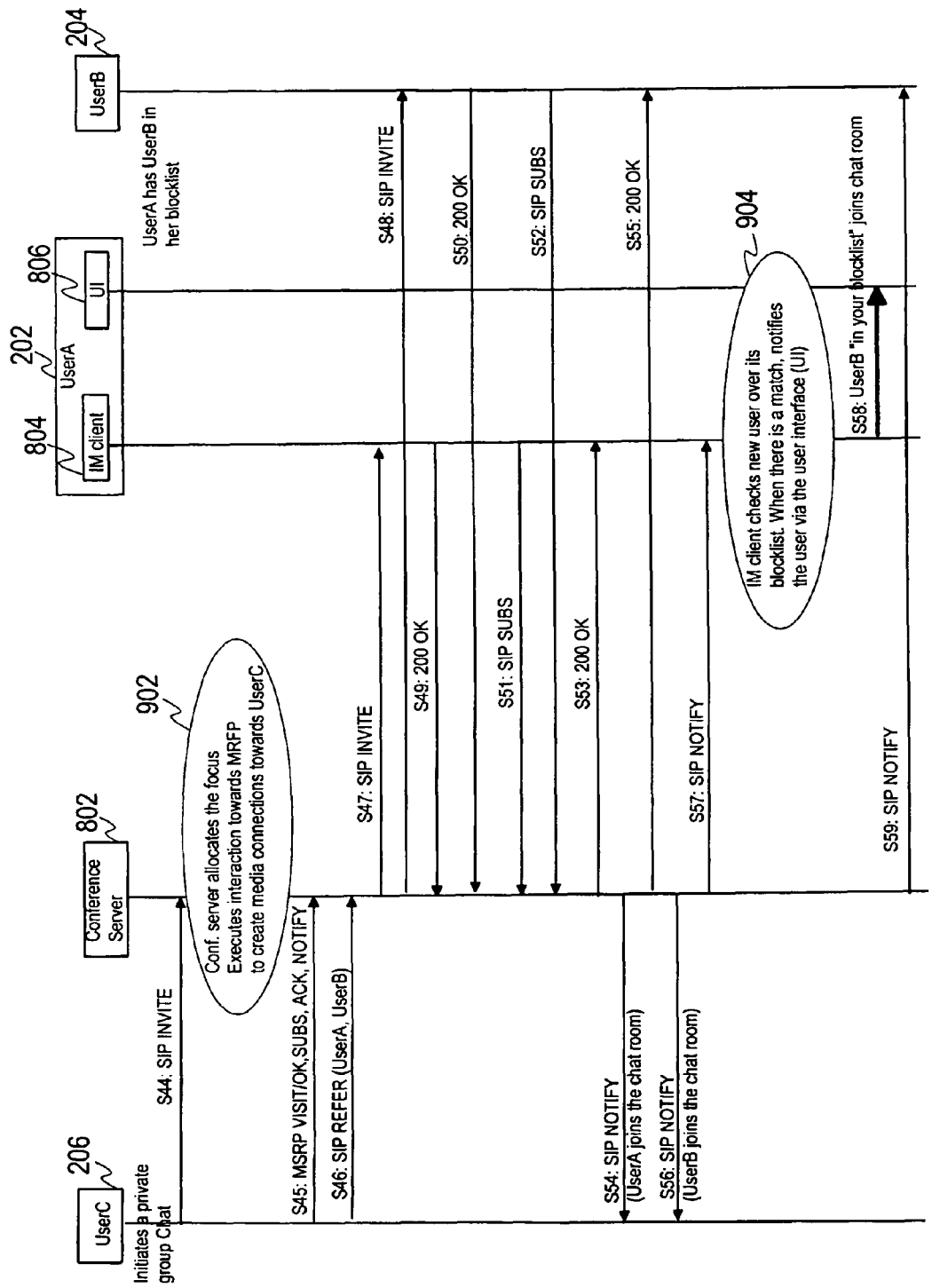
FIG. 9 shows the signalling messages exchanged for the third embodiment of the invention.

FIG. 9 shows the exchange of signalling messages between the entities described above with reference to FIG. 8. In common with the previous embodiments, User C initiates the chat session by sending a SIP INVITE message to the conference server 802 at step S44. The conference server at 902 then creates focus instance and reserves mixer resources. Then User C subscribes to the conference state notifications. This process involves communication between the conference server and User C at step S45.

User C then sends a SIP REFER message to the conference server at step S46, indicating that User A and User B should be invited to the chat room. The conference server sends SIP INVITE messages to User A and User B at steps S47 and S48, respectively, and these are acknowledged with 200 OK messages from User A and User B at steps S49 and S50. User A and User B subscribe to the chat room with SIP SUBSCRIBE messages sent to the conference server at steps S51 and S52. The conference server acknowledges with 200 OK messages to User A and User B at steps S53 and S55. Meanwhile, the conference server notifies User C that User A has joined the chat room at steps S54, and does likewise for User B at S56.

In the present embodiment of the invention, the comparison between the users joining the chat room, and those listed in a participant's blocklist is not performed at the conference server. Instead, when a new user joins the chat room a SIP NOTIFY message is sent to the participants. In the case of the example in FIG. 9, User A is sent a SIP NOTIFY message at step S57. The IM client 804 at the user terminal then compares the user joining the chat room with the blocklist stored locally at the IM client at 904. In the case of User A, the IM client will find a match in the blocklist when User B joins the chat room. Upon finding the match, the IM client informs the user through the UI in step S58.

User A has the same options as in the previous embodiments upon receiving the notification from the IM client. User A has the option of staying in the chat room but not viewing any text from User B, updating his blocklist to allow User B's text to be viewed temporarily, or User A can choose to not join and leave the chat room. If User A chooses to remain in the chat room, but not view any text from User B, then the IM client performs the filtering of User B's text. All other participants in the chat room can see User B's text. No other participants will know that User A is having User B's messages filtered.

If User B, as a new joining user, had any of the already participating users in his blocklist (e.g. if User B had User A in its blocklist), then the IM client in User B's terminal would notify User B, as above, and User B would have the same three options as User A outlined previously. However, in the example shown here, User B does not have any of the other participants in his blocklist, and therefore, after being sent a SIP NOTIFY message at S43, the IM client does not find a match and does not need to notify User B.

This embodiment of the invention does not require a modified SIP notify message, as was the case with the previous two embodiments. This is because the notification comes from the IM client, which is local to the participant, and the notification that is sent is dependent on the UI that is used.

The three embodiments described above have the advantage that the creator of the chat room can invite anyone to participate, without having to know any details of the invitee's preferences. Instead, it is the invitee to the chat room (e.g. User A) who is given the option of how to deal with the presence of a blocked user. Therefore, the creator of the chat room does not need to be provided with any details of the invitee's private blocklist information. Furthermore, unlike other known solutions, it does not appear that there is an fault in the IM system.

The invention claimed is:

1. A method, comprising:
causing a user terminal corresponding to a first user to join a chat session including at least one other user and initiated by one of the at least other users, the user terminal comprising an instant messaging client, wherein the causing comprises sending by the user terminal a session initiation protocol subscribe message to join the chat session and receiving at the user terminal a session initiation protocol message indicating the user terminal has been joined to the chat session;
receiving, at the user terminal and subsequent to the user terminal joining the chat session, a session initiation protocol notify message that identifies a second user, wherein the second user is another one of the at least one users which has joined the chat session or is already in the chat session as another one of the at least one other users at the time the first user joins the chat session;
checking, at the user terminal, with the instant messaging client whether the second user is listed in a blocklist of users blocked from communicating with the first user, wherein the blocklist contains a list of users blocked by the first user; and
in response to the second user being listed in the blocklist, notifying the first user via a user interface of the user terminal that the second user is listed in the blocklist.

2. The method of claim 1, where the blocklist is stored at the instant messaging client of the user terminal.

3. The method of claim 1, where the session initiation protocol notify message is received from a conference server.

4. The method of claim 1, where causing further comprises receiving an invitation as a session initiation protocol invite message from a conference server to join the chat session, and, in response to the invitation, sending the session initiation protocol subscribe message to the conference server.

5. A user terminal, comprising:
a user interface;
at least one processor; and
at least one memory including computer program code,
the at least one memory and the computer program code configured to, with the at least one processor, cause the user terminal to perform at least the following:
implementing an instant messaging client;
causing the user terminal, corresponding to a first user, to join a chat session including at least one other user and initiated by one of the at least other users, wherein the causing comprises sending by the user terminal a session initiation protocol subscribe message to join the chat session and receiving at the user terminal a session initiation protocol message indicating the user terminal has been joined to the chat session;
receiving, at the user terminal and subsequent to the user terminal joining the chat session, a session initiation protocol notify message that identifies a second user, wherein the second user is another one of the at least one users which has joined the chat session or is already in the chat session as another one of the at least one other users at the time the first user joins the chat session;
checking, at the user terminal, with the instant messaging client whether the second user is listed in a blocklist of users blocked from communicating with the first user, wherein the blocklist contains a list of users blocked by the first user; and
in response to the second user being listed in the blocklist, notifying the first user via the user interface that the second user is listed in the blocklist.

6. The user terminal of claim 5, where the blocklist is stored at the instant messaging client.

7. The method of claim 1, further comprising providing the first user an option of remaining in the chat session but not viewing chat from the second user, and, in response to the user selecting the option of remaining in the chat session but not viewing chat from the second user, the instant messaging client filtering chat from the second user so that the first user does not see the chat from the second user.

8. The method of claim 1, further comprising providing the first user an option of updating the blocklist to allow chat of the second user to be viewed, wherein in response to the user selecting the option of updating the blocklist to allow chat of the second user to be viewed, chat from the second user is viewable in the user interface by the first user.

9. The user terminal of claim 5, wherein the at least one memory and the computer program code are further configured to, with the at least one processor, cause the apparatus to perform at least the following: providing the first user an option of remaining in the chat session but not viewing chat from the second user, and, in response to the user selecting the option of remaining in the chat session but not viewing chat from the second user, the instant messaging client filtering chat from the second user so that the first user does not see the chat from the second user.

10. The user terminal of claim 5, wherein the at least one memory and the computer program code are further configured to, with the at least one processor, cause the apparatus to perform at least the following: providing the first user an option of updating the blocklist to allow chat of the second user to be viewed, wherein in response to the user selecting the option of updating the blocklist to allow chat of the second user to be viewed, chat from the second user is viewable in the user interface by the first user.

11. The user terminal of claim 5, where the session initiation protocol notify message is received from a conference server.

12. The user terminal of claim 5, where causing further comprises receiving an invitation as a session initiation protocol invite message from a conference server to join the chat session, and, in response to the invitation, sending the session initiation protocol subscribe message to the conference server.

13. A computer program product comprising a computer-readable memory medium bearing computer program code embodied therein for use with a computer, the computer program code comprising:
  code for causing a user terminal corresponding to a first user to join a chat session including at least one other user and initiated by one of the at least other users, the user terminal comprising an instant messaging client, wherein the causing comprises sending by the user terminal a session initiation protocol subscribe message to join the chat session and receiving at the user terminal a session initiation protocol message indicating the user terminal has been joined to the chat session;
  code for receiving, at the user terminal and subsequent to the user terminal joining the chat session, a session initiation protocol notify message that identifies a second user, wherein the second user is another one of the at least one users which has joined the chat session or is already in the chat session as another one of the at least one other users at the time the first user joins the chat session;
  code for checking, at the user terminal, with the instant messaging client whether the second user t is listed in a blocklist of users blocked from communicating with the first user, wherein the blocklist contains a list of users blocked by the first user; and
  code for, in response to the second user being listed in the blocklist, notifying the first user via a user interface of the user terminal that the second user is listed in the blocklist.

14. The computer program product of claim 13, further comprising code for providing the first user an option of remaining in the chat session but not viewing chat from the second user, and, in response to the user selecting the option of remaining in the chat session but not viewing chat from the second user, the instant messaging client filtering chat from the second user so that the first user does not see the chat from the second user.

15. The computer program product of claim 13, further comprising code for providing the first user an option of updating the blocklist to allow chat of the second user to be viewed, wherein in response to the user selecting the option of updating the blocklist to allow chat of the second user to be viewed, chat from the second user is viewable in the user interface by the first user.

16. The computer program product of claim 13, where the session initiation protocol notify message is received from a conference server.

17. The computer program product of claim 13, where causing further comprises receiving an invitation as a session initiation protocol invite message from a conference server to join the chat session, and, in response to the invitation, sending the session initiation protocol subscribe message to the conference server.

* * * * *